United States Patent Office 3,565,528
Patented Feb. 23, 1971

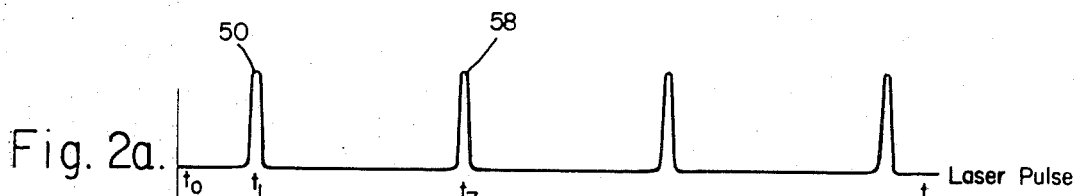
Fig. 2a. — Laser Pulse
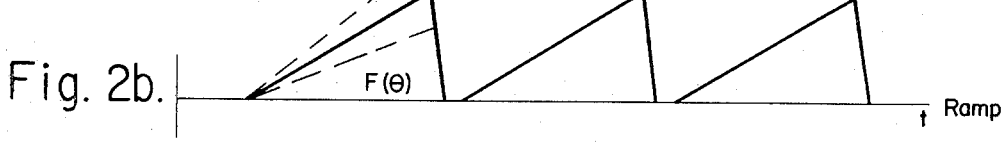
Fig. 2b. — Ramp
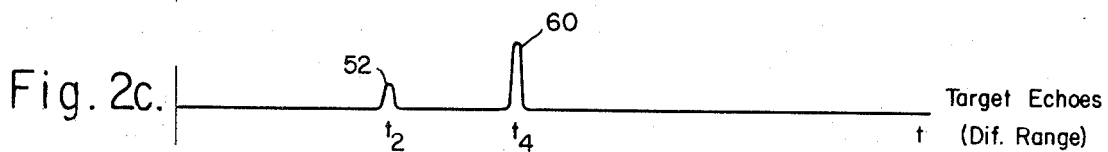
Fig. 2c. — Target Echoes (Dif. Range)
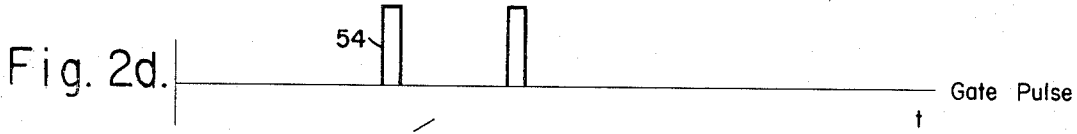
Fig. 2d. — Gate Pulse
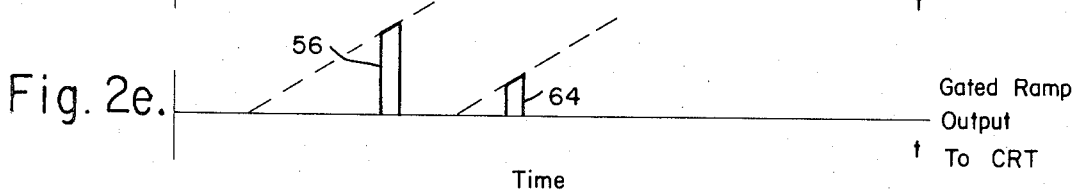
Fig. 2e. — Gated Ramp Output To CRT
Time

3,565,528
CONTOUR MAPPER DATA PRESENTATION STORAGE DEVICE
Robert S. Witte, Redondo Beach, Calif., assignor to TRW Inc., Redondo Beach, Calif., a corporation of Ohio
Filed Oct. 25, 1967, Ser. No. 678,071
Int. Cl. G01c 3/08
U.S. Cl. 356—5                                          7 Claims

ABSTRACT OF THE DISCLOSURE

A pulsed laser transmitter emits a scanning laser beam. Visual display means are provided for indicating the angular position of the beam with respect to the transmitter. Circuit means responsive to the presence of a pulsed beam initiates means for providing an increasing intensity signal to the visual display means. A receiver detects echo pulses from targets and provides an output signal indicating the presence of the pulse. Gating means responsive to the receiver output signal limits the intensely displayed. The displayed pattern will then contain position and range information. The position of the pattern on the visual display means is a function of the angular position of the laser beam and the intensity of the pattern is a function of the range between the laser transmitter and a target from which the echo pulse has emanated.

BACKGROUND OF THE INVENTION

This invention pertains to the field of laser ranging devices and, more particularly, to a laser ranging system particularly adapted for contour mapping. Various types of laser ranging systems exist in the prior art. One such device is disclosed in U.S. Pat. No. 3,278,753 entitled "Underwater Detection System," by R. M. Pitts et al. The device of that patent is directed specifically to an underwater object detector which utilizes light energy from a laser. The device specifically deals with the problem of achieving a usable signal in the presence of backscatter, resulting from a pulse of coherent light reflecting from objects and particles subsisting in the underwater environment. The device attacks this problem by noting that under normal conditions, the backscatter from a pulse of coherent light decreases following an exponential curve. The detection is accomplished by comparing a received backscatter pattern with a backscatter pattern which follows the normal exponential pattern. The comparison is effected by delaying the received exponential decaying wave and substrating its amplitude from a known exponential wave. In the absence of a target, the difference between the two waves will be zero. A target interrupting the propagated light pulse results in a lesser or greater backscatter than usual, and the compared waves will be different. The resulting difference is applied to a detector that indicates the presence and location of the object by standard radar techniques.

Another pertinent device is disclosed in U.S. Pat. No. 2,968,987 entitled "Method and Apparatus for Measuring Depths of Water and Detecting Submerged Bodies by Employing Pulsed Light," by J. J. Knopow. In the device of that patent, a pulsed light transmitter capable of emitting an intense pulse of light and a receiver which is operable at the instant the transmitted pulse of light is in the water, is operated such that the receiver receives a steadily decreasing light intensity due to the direct light and the illumination of the scattering haze produced by the light pulse as it increases in depth. In the absence of a target, the direct and scattered light received, as observed along the same path that the light pulse traveled into the water, decreases smoothly in an exponential manner. If a target is intercepted by the light pulse, the light will be absorbed by the relatively non-reflecting target surface and, consequently, the light observed by the receiver will drop sharply, indicating the presence of a target. The system of this application is versatile in that it is applicable to both underwater target detection and to surface contour mapping.

SUMMARY OF THE INVENTION

In a preferred embodiment of the invention, a light transmitter transmits sequential pulses of light formed into a beam which is angularly propagated from the transmitter. Circuit means responsive to each of the emitted pulses provides an initiate signal activating an intensity circuit which provides a signal having an increasing amplitude. Visual indicator means connected to the transmitter means and responsive to the angular position of the light beam provides a visual signal of the angular position of the beam with respect to the transmitter. A receiver detects ecso pulses and provides an output signal indicating the presence of the pulse. Means responsive to the output signal from the receiver provides a terminate signal to the intensity circuit limiting the intensity on the visual indicator. The intensity of the displayed signal is then a direct function of the distance between the transmitter and the echo target. Various means can be used to determine the various intensities displayed. One such means could be a densitometer.

Accordingly, it is an object of the present invention to provide an improved laser ranging device.

It is a further object of the present invention to provide a laser ranging device wherein the intensity of the displayed signal is a function of range.

It is another object of the present invention to provide an optical device for detecting the contours of land masses and the depth of bodies of water.

The aforementioned and other objects of the present invention will become more apparent when taken in conjunction with the following description and drawings, throughout which like characters indicate like parts, and which drawings form a part of this application.

BRIEF DESCRIPTION OF THE DRAWINGS

FIG. 2 illustrates wave forms useful in understanding the operation of the embodiment shown in FIG. 1.

BRIEF DESCRIPTION OF THE PREFERRED EMBODIMENT

Figure 1:
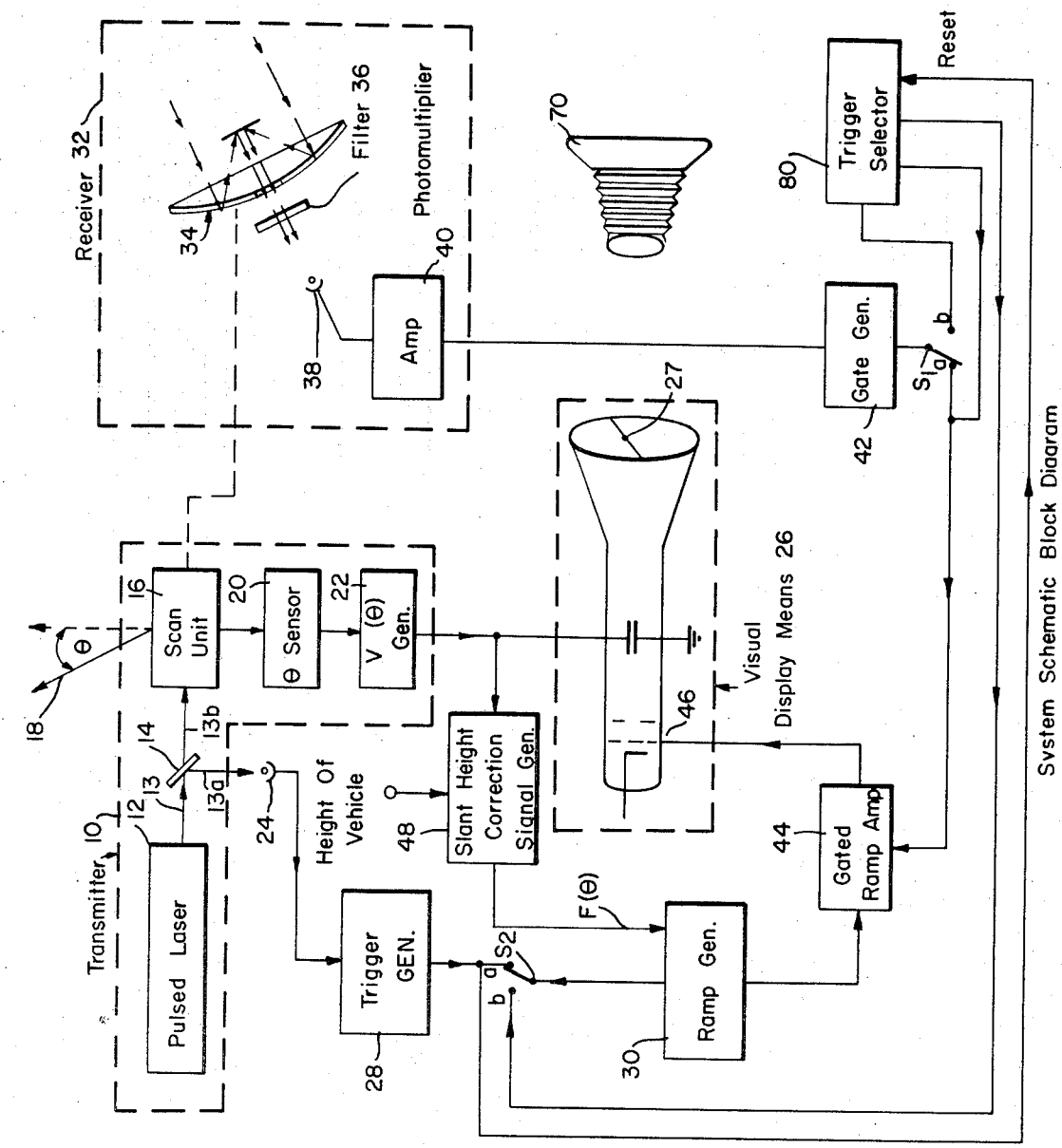
FIG. 1 illustrates in block diagram form the preferred embodiment of the invention.

Referring to FIG. 1, the transmitter means 10 is shown comprised of a pulsed laser 12, beam splitter 14, scan unit 16, θ sensor 20 and a V(θ) potential generator 22. The pulsed laser 12 generates a beam 13 of coherent light pulses. The beam of pulses is directed to the beam splitter 14 which directs a portion of the beam 13a to the photomultiplier 24. The remaining portion of the beam 13b is then directed to a scan unit 16. The scan unit angularly deflects the beam to sweep out a mapping path. The angular position of the optical beam 18 with respect to the reference axis of the scan unit is a function of the angle θ. The scan unit 16 also provides angular information as to the position of the beam to the θ angle sensor 20. The scan unit 16 may be any one of the well-known types of light deflectors known in the prior art. Some devices which may be selected for the scan unit are disclosed in an article entitled "Interaction Between Light and Sound," by R. Adler, I.E.E.E. Spectrum, May 1967. Another article, entitled "Some Photographic Studies of the Light Output of an Intra-Cavity Modulated Gas Maser," by L. E. Hargrove and J. S. Courtney (Pratt, Journal of the SMPTE), vol. 74, p. 1085, discloses additional useful devices which may be used.

The output of the $\theta$ angle sensor is sent to a potential generator 22 which provides an output potential $V(\theta)$ that is a function of the angle $\theta$. The beam position signal from the potential generator 22 is fed to a visual display means 26, which may be a cathode ray type display, wherein the position of an intensity dot 27 on the face of the tube indicates the angular position of the beam 18. The display means could also be a color display where the intensity signal would cause a change in hue and/or tint of the dot.

Referring back to beam 13a which is directed to the photomultiplier 24, the photomultiplier senses the presence of the beam of pulses 13a and provides an electrical output of pulses corresponding to the received light pulses. The pulsed output of the photomultiplier is then fed to a trigger generator 28. The trigger generator provides an output trigger pulse upon receipt of an output from the photomultiplier 24. The trigger pulses from generator 28 are fed to a ramp generator 30. The ramp generator, upon receipt of a trigger pulse, initiates at its output a linearly increasing potential signal which is periodic, the period corresponding to the period of said laser pulses. The output of the ramp generator 30 is fed to the intensity grid 46 of the display means 26 via a gated ramp amplifier 44.

The receiver means 32 is shown comprised of a directional set of light collecting optics 34, the angular position of which is servoed to the scan unit 16 so as to coincide with the angular position of the laser beam 18. Return echos from various targets are received by the collecting optics 34 and are directed to a filter 36 which filters out background radiation which normally adds noise to the system. The output of filter 36 is then directed to the photomultiplier 38, which transforms the light echo into an electrical signal. The output of the photomultiplier 38 is directed to an amplifier 40 for amplification. The output of amplifier 40 is connected to a gate generator 42. The gate generator is responsive to the signal from amplifier 40 and provides a gating signal at its output, which is time synchronous with the received echo signal at the photomultiplier 38. The output of the gate generator 42 is directed to the gated ramp amplifier 44. The gated ramp amplifier, upon receipt of a gating signal from the gate generator 42, connects the output of the ramp generator 30 to the intensity grid 46 of the cathode ray display device 26. The intensity of the displayed spot 27 on the face of the cathode ray device 26 will then be a function of the elapsed time between the transmission of the optical pulse 18 and the receipt of the echo pulse.

In a preferred operating environment, the entire system is mounted in an aircraft with the laser beam 18 directed downward to the surface of the earth. The system as described above will provide target range and position information through the intensity and position respectively of the displayed spot. If surface contour information is desired, means for correcting for range variations caused solely by changes in slant height and aircraft altitude as a function of $\theta$ should be provided. This means is provided by a slant height correction signal generator 48 which receives as an input a signal indicative of the height of the vehicle and the potential output of the generator 22, which is a function of the angular position of the beam 18 with respect to the scan unit and the aircraft itself. The slant height correction generator provides an output signal $F(\theta)$ to the ramp generator 30 which modifies the slope of the ramp as a function of the height of the vehicle and the scan angle $\theta$. In this manner, height and scan angle deviations are not reflected in the intensity of the spot displayed, and the visual display will be representative of the band contour.

Referring now to FIGS. 2a to 2e, in FIG. 2a a plurality of pulses which make up the beam 13 are shown.

In FIG. 2b, the output of the ramp generator 30 is illustrated. The ramp (intensity signal) is initiated upon receiving a trigger from the trigger generator 28 which corresponds in position of time $t_1$ to the laser pulse 50. The ramp signal is linear and in the contour mapping mode of operation, the slope $F(\theta)$ is a function of the signal from the slant height correction signal generator 48 which increases or decreases the slope of the ramp as a function of the height of the vehicle above the surface contour, which is a reference plane, and the scan angle $\theta$. Upon receipt of a target echo 52 by the receiver means 32 at time $t_2$, the gate generator 42 generates a gating pulse 54 which activates the gated ramp amplifier 44 and allows the output of the ramp generator to be fed to the intensity grid 46 of the visual display 26. The amplitude of the ramp signal is then a direct function of the time $t_2-t_1$ between the initiating laser pulse 50 and the echo pulse 52. Going through the operating cycle once more, a second laser pulse 58 is transmitted, initiating the ramp generator 30, generating a linearly increasing potential signal. A target echo 60 received at time $t_4$ initiates a gate pulse 62 from the gate generator 42 which in turn activates the gated ramp amplifier 44 connecting the intensity signal 64 from the ramp generator 30 to the intensity grid 46 of the visual display device. The amplitude of the ramp signal is then a direct function of the time $t_4-t_3$ between the initiating laser pulse 58 and the echo pulse 60. The recurrence rate of the ramp signal should be such that the visual display means is blank before the initiation of a laser pulse; otherwise, overlapping of the displayed ramp signal may occur.

A strip camera 70 or other permanent recording device may be used to provide a storage of the information displayed on the face of the visual display device. The scan rate of the beam can be adjusted to correspond to the speed of the vehicle to ensure that the beam covers (scans) all of the area covered by the vehicle. Various scanning methods well known to those persons skilled in the art may be used in combination with this scheme to achieve the desired results.

Referring back to FIG. 1, in contour mapping of areas containing bodies of water, it is highly desirable to be able to determine the depth of the water. This can be achieved by delaying the start of the ramp generator until an echo is received from the surface of the water. The second echo which will bounce off the bottom, in relatively shallow water, or from a submerged target, will activate the gated ramp amplifier 44 and the ramp signal will be displayed. Bodies of land and other solid objects not having a second echo pulse will appear black on the visual display. Land contour mapping is achieved when switch $S_1$ and $S_2$ are in the $a$ position, and water mapping when the switches are in the $b$ position. In the $b$ position, a trigger selector 80 which is, in essence, a simple counter, receives a set signal from the trigger generator 28. The first gate signal received from gate generator 42 after the set signal is received is directed to the ramp generator 30 via the switch $S_2$ ($b$ position). The second gate signal received by the trigger selector is directed to the gated ramp amplifier 44 which effectively connects the ramp signal to the intensity grid 46.

The laser contour mapper of this invention may also be used in combination with a standard radar set to determine the thickness of ice. The laser contour mapper will give the first echo from the top of the ice and the radar will give the second echo from the bottom, the difference in detected distances being the ice thickness.

While there has been shown what is considered to be the preferred embodiment of the present invention, it will be manifest that many changes and modifications may be made therein without departing from the essential spirit of the invention. It is intended, therefore in the annexed claims, to cover all such changes and modifications as may fall within the true scope of the invention.

What is claimed is:
1. A laser system for mapping range of a desired area, said laser system comprising:
(a) a pulsed laser transmitter;
(b) visual display means;
(c) means responsive to a transmitted laser pulse for generating an electrical ramp signal in response to the occurrence of a pulse from said transmitter and for applying said electrical ramp signal to said display means for increasing the intensity of said display;
(d) receiver means for receiving an echo of said transmitted laser pulse from a target within the desired area and providing an electrical output signal indicative of the time of occurrence of said received echo; and
(e) gating means responsive to said electrical output signal for limiting the amplitude of said ramp signal, thereby to limit the intensity of said display.

2. The invention, according to claim 1, wherein said pulsed laser transmitter also cludes meansfor scanning a target with said laster pulses, and further comprising means for determining the angular direction of said pulses with respect to said transmitter; and
means for positioning said displayed intensity signal as a function of said determined direction.

3. In combination:
a pulsed laster transmitter for generating a beam of laser pulses, said transmitter including means for scanning a target with said beam;
means for receiving echo pulses from said target;
means responsive to said transmitted pulses generating periodically increasing amplitude electrical signals corresponding in periodicity to the period of said transmitted pulses;
means transforming said received echo pulses into corresponding electrical pulses;
visual display means;
means responsive to said electrical pulses connecting said increasing aplitude electrical sigal to said display means upon receipt of an electrical pulse, causing and intensity signal to be displayed, the intensity of which corresponds to the amplitude reached by said electrical signal; and
means for displacing said displayed intensity signal as a funtion of the angular position of said beam with respect to said transmitter.

4. The invention, according to claim 3, and further compirsing means for varying the slope of said increasing amplitude electrical signal as a function of the displacement of said transmitter with respect to a reference plane and the angular position of said beam with respect to said transmitter.

5. A laser system for scanning a target to provide a contour map, said laser system comprising:
(a) a pulsed laser transmitter for generating a beam of laser pulses;
(b) means for scanning said laser beam across the target;
(c) means providing an angular position signal indicative of the angular position of said beam with respect to said transmitter;
(d) means for receiving echo pulses from the target;
(e) means for responsive to said received echo pulses for developing corresponding electrical pulses;
(f) visal display means;
(g) means responsive to said angular position signal for providing said visual display means with a displacement signal for positioning a visual indication on said display means indicative of said angular position;
(h) means responsive to said electrical pulses for generating an electrical signal having a substantially linearly increasing amplitude upon occurrence of a first electrical pulse after a transmitted laser pulse and for limiting the aplitude of said electrical signal upon occurrence of a second electrical pulse after a transmitted laser pulse; and
(i) means responsive to said second electrical pulse for applying said amplitude limited electrical signal to said display means for controlling the intensity of said visual indication.

6. The invention, according to claim 5, and further comprising means for permanently recording the position and amplitude of said visual display.

7. In combination:
a pulsed laser transmitter for generating a beam of laser pulses which is directed to a target;
means for generating electrical pulses corresponding to said laser pulses;
means for receiving echo pulses from said target;
transforming means transforming said received echo pulses into corresponding electrical echo pulses;
visual display means;
means for generating an increasing amplitude electrical signal upon receipt of a signal pulse;
gating means for connecting said generating means to said visual display means upon receipt of a gate pulse; and
switch means in a first position connecting said electrical pulse generating means to said increasing amplitude electrical signal generating means, and connecting of the output said transforming means to said gating means to provide a gate pulse to said gating means corresponding to a received echo pulse, said switch means in a second position connecting a first received output pulse from said transforming means to said increasing amplitude electrical signal generating means, and a second received output pulse from said transforming means to said gating means, providing said gating means with a gating pulse.

References Cited

UNITED STATES PATENTS 2,930,278  3/1960  Hansen et al. _____ 356—5
3,402,630  9/1968  Blau et al. _____ 356—4UX

OTHER REFERENCES

IBM Technical Disclosure Bulletin, R. W. Kern and W. E. Goetz, vol. 7, No. 2, July 1964, p. 144.

RODNEY D. BENNETT, JR., Primary Examiner

J. G. BAXTER, Assistant Examiner